US009977652B2

(12) United States Patent
Wadden et al.

(10) Patent No.: US 9,977,652 B2
(45) Date of Patent: May 22, 2018

(54) SYSTEM, METHOD, AND COMPUTER-READABLE MEDIUM FOR HIGH THROUGHPUT PSEUDO-RANDOM NUMBER GENERATION

(71) Applicant: University of Virginia Patent Foundation, Charlottesville, VA (US)

(72) Inventors: John Pierson Wadden, Charlottesville, VA (US); Nathan James Brunelle, Charlottesville, VA (US)

(73) Assignee: University of Virginia Patent Foundation, Charlottesville, VA (US)

( * ) Notice: Subject to any disclaimer, the term of this patent is extended or adjusted under 35 U.S.C. 154(b) by 108 days.

(21) Appl. No.: 15/091,925

(22) Filed: Apr. 6, 2016

(65) Prior Publication Data

US 2017/0083288 A1 Mar. 23, 2017

Related U.S. Application Data

(60) Provisional application No. 62/147,045, filed on Apr. 14, 2015.

(51) Int. Cl.
*G06F 1/02* (2006.01)
*G06F 7/58* (2006.01)

(52) U.S. Cl.
CPC ........ *G06F 7/584* (2013.01); *G06F 2207/583* (2013.01)

(58) Field of Classification Search
CPC .............................................. G06F 7/58–7/586
USPC .................................................. 708/250–256
See application file for complete search history.

(56) References Cited

U.S. PATENT DOCUMENTS

2014/0279776 A1* 9/2014 Brown .................... G06F 9/444 706/20
2014/0289295 A1* 9/2014 Lewis ..................... G06F 7/584 708/250

OTHER PUBLICATIONS

Skratchdot ("random-seed" software function module, published on GitHub.com, released on Jun. 1, 2014, URL:https://github.com/skratchdot/random-seed,).*

(Continued)

*Primary Examiner* — Tan V. Mai
(74) *Attorney, Agent, or Firm* — Finnegan, Henderson, Farabow, Garrett & Dunner LLP

(57) ABSTRACT

Disclosed embodiments include systems, methods, and computer-readable media for generating pseudo-random numbers. Disclosed embodiments may receive, by the at least one processor, range data indicating a range of numbers. Disclosed embodiments may generate, based on the range data and by the at least one processor, a digitized finite state machine configured to produce pseudo-random output within the range of numbers. Further, disclosed embodiments may provide, by the at least one processor to a specialized pattern-matching device, programmable instructions to implement the digitized finite state machine on the specialized pattern-matching device. Disclosed embodiments may transmit, by the at least one processor to the specialized pattern-matching device, a pseudo-random bit stream for processing by the digitized finite state machine. Disclosed embodiments may receive, by the at least one processor from the specialized pattern-matching device, pseudo-random output from the digitized finite state machine.

18 Claims, 6 Drawing Sheets

(56) References Cited

OTHER PUBLICATIONS

Dlugosch, Paul ("Micron Automata Processor a New Approach to Information Analysis", published on HPCuserforum.com, published on Apr. 22, 2014, URL: http://www.hpcuserforum.com/presentations/santafe2014/Micron.pdf).*

* cited by examiner

SYSTEM, METHOD, AND COMPUTER-READABLE MEDIUM FOR HIGH THROUGHPUT PSEUDO-RANDOM NUMBER GENERATION

CROSS-REFERENCE TO RELATED APPLICATIONS

This application claims the benefit of U.S. Provisional Patent Application No. 62/147,045, filed on Apr. 14, 2015. The contents of the above-referenced application are expressly incorporated herein by reference for all purposes.

GOVERNMENT LICENSE RIGHTS

This invention was made with government funds under Agreement No. HR0011-13-3-0002 awarded by DARPA. The U.S. Government has rights in this invention.

BACKGROUND

Pseudo-random number generation (PRNG) may be used in simulation and cryptographic applications. For example, Monte Carlo methods are pervasive simulation tools in physical and social sciences and rely on continuous random sampling to drive simulations of unpredictable processes. Monte Carlo simulations were among the first use cases for computers and are arguably some of the most important algorithms ever invented. Because fast and high-quality random number generation may be on the critical path of these applications, developing fast and high-quality PRNGs may improve the quality and speed of computational sciences.

Research into creating high-quality pseudo-random sequences has existed since the first Monte Carlo simulation on a digital computer. Today, while there are many PRNG algorithms, not all are created equal. No matter the method, pseudo-random output that is harder to distinguish from a truly random output better represents a truly random number stream. Statistical tests, such as the Knuth test, exist to identify patterns in pseudo-random sequences. These tests form the basis of many modern statistical test suites. The most comprehensive and stringent tests are the BigCrush test battery from TestU01 suite, which includes the functionality of the Knuth tests, DIEHARD, and the NIST statistical test suite. A test in the suite fails if it identifies a property of the pseudo-random sequence that should not exist in true randomness.

BRIEF SUMMARY

In accordance with embodiments of the present disclosure, computer-implemented systems, methods, and computer-readable media are provided for generating pseudo-random numbers. Embodiments of the present disclosure also include computerized systems, methods, and computer-readable media for programming a specialized pattern-matching device with a digitized finite state machine based on probabilistic characteristics. Embodiments of the present disclosure may be implemented for generating pseudo-random output.

In accordance with an embodiment, a computer-implemented system is provided for generating pseudo-random numbers. The system may include a storage device that stores instructions and at least one processor that executes the instructions. The instructions may cause the at least one processor to receive, by the at least one processor, range data indicating a range of numbers. Also, the instructions may cause the at least one processor to generate, based on the range data and by the at least one processor, a digitized finite state machine configured to produce pseudo-random output within the range of numbers. Further, the instructions may cause the at least one processor to provide, by the at least one processor to a specialized pattern-matching device, programmable instructions to implement the digitized finite state machine on the specialized pattern-matching device. The instructions may cause the at least one processor to transmit, by the at least one processor to the specialized pattern-matching device, a pseudo-random bit stream for processing by the digitized finite state machine. The instructions may additionally cause the at least one processor to receive, by the at least one processor from the specialized pattern-matching device, pseudo-random output from the digitized finite state machine.

Computer-readable media are also provided for implementing methods of the present disclosure. Additional embodiments and related features of the present disclosure are presented herein.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

DETAILED DESCRIPTION

Figure 1:
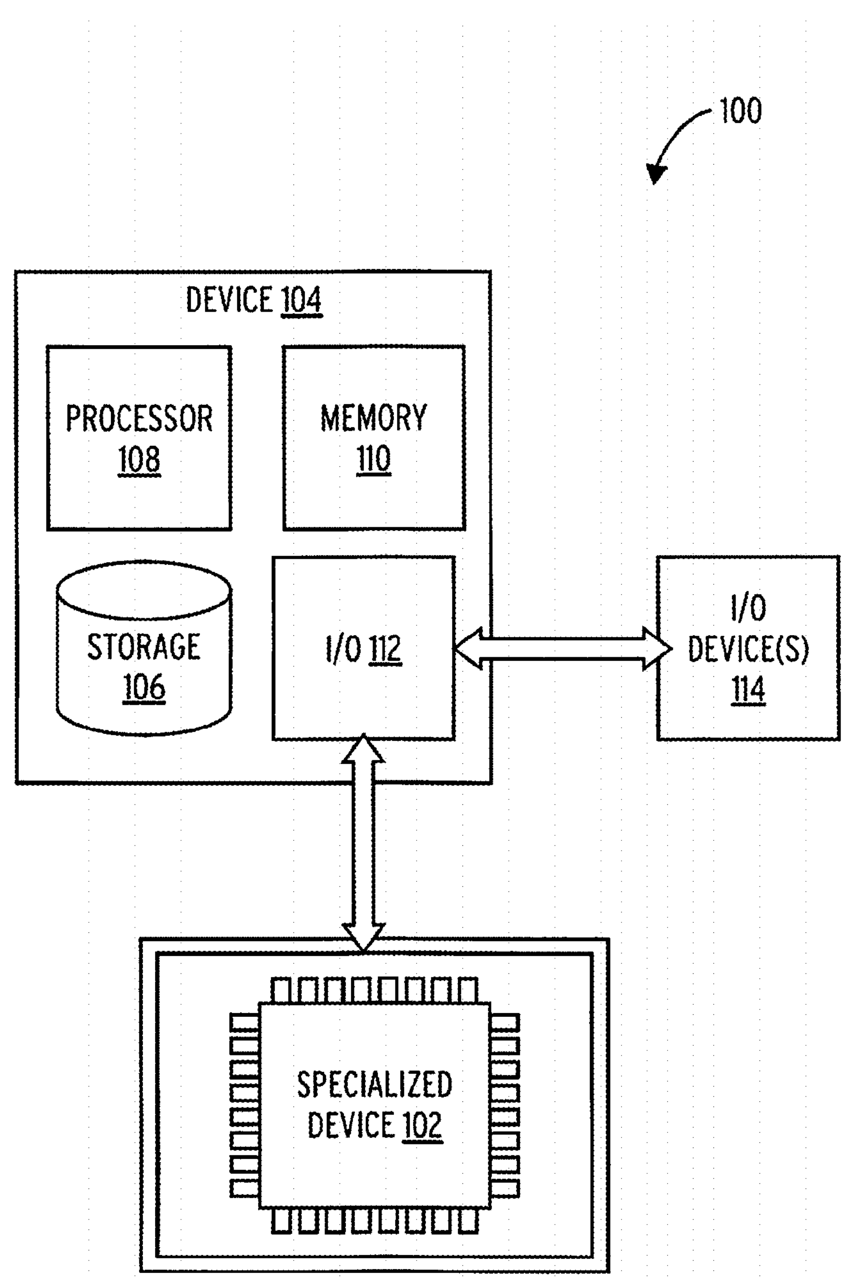
FIG. 1 illustrates an exemplary system for generating pseudo-random numbers in accordance with disclosed embodiments.

Disclosed embodiments may be directed to systems and methods for a fast, scalable, and high-quality pseudo-random number generator (PRNG). In designing a random number generator, one may be faced with deciding between the competing tradeoffs of efficient computer processing and the quality of randomness of the results. For example, a random number generator may produce results with a very high amount of randomness (e.g., quality). However, the high quality generator may require impractical computing resources and/or utilize an excessively long run time. Disclosed embodiments may be related to an improved PRNG that improves computing efficiency while maintaining a predefined level of quality for the randomness of the results. Additionally, disclosed embodiments may permit selection of higher quality results (e.g., increased randomness).

As the breakdown in Dennard scaling makes it increasingly expensive to improve performance of traditional serial von Neumann architectures, heterogeneous computing, involving graphics processing units (GPUs), digital signal processors (DSPs), field programmable gate arrays (FPGAs), application-specific integrated circuits (ASICs) and other processors may provide improved solutions. By matching computation kernels to the most effective or efficient available processor, disclosed embodiments may provide power efficiency and performance gains at current transistor technology nodes. Micron, leveraging their experience and IP in memory technology, has developed the Automata Processor (AP), a large-scale, native-hardware implementation of non-deterministic finite automata (NFA). While the AP is not suitable for traditional integer or floating point computation, NFAs are extremely powerful and efficient pattern matchers, and have been shown to provide large speedups over von Neumann architectures such as CPUs and GPUs for rule-based datamining kernels.

An AP implements an NFA using a reconfigurable network of state transition elements (STEs) that consume an input stream of 8-bit symbols. Each STE can be activated and cause transitions to other STEs. STEs are capable of single-bit reports, analogous to "accepting states" in traditional NFAs. Disclosed embodiments may utilize an AP to form a fast, scalable, and high-quality PRNG.

Instead of driving automata transitions using conventional input (e.g. a DNA sequence), disclosed embodiments may dictate automata transitions using input designed to be random or pseudorandom. Because activations of STEs in the AP are conditional on the input stream, a probabilistic or random input stream may provide probabilistic or random automata transitions, even though the transition rules are deterministic. Thus, probabilistic automata, including finite state Markov chains, may be emulated using the AP.

Accordingly, disclosed embodiments may create a scalable, high-throughput, and high-quality PRNG using Markov chains modeled by STEs on an AP. Some embodiments may use parallel Markov chains to model rolls of fair dice, and then combine the results of each roll into a new random output string. By combining the output of parallel rolls, driven by a single stream of random input symbols, disclosed embodiments may construct a new pseudo-random output many times larger than the random input used to drive transitions on a chip. Though, emulating Markov chains using NFAs with fixed transition functions may cause any number of parallel Markov chains that consume the same input to produce output that may be correlated. For example, some output configurations of the states of Markov chains may be more probable than others, and thus the random output may eventually appear non-uniform, which may be important to avoid when attempting to create pseudo-random numbers. Accordingly, disclosed embodiments may address the effect of the number and size of parallel Markov chains on the quality of pseudo-random output, as well as the maximum duration for running parallel Markov chains before detecting non-uniform output. Disclosed embodiments may implement the AP on a modern memory specification and technology node to provide 40 GB/s of high-quality random throughput per chip.

FIG. 1 illustrates exemplary system 100 for generating pseudo-random numbers. In some embodiments, system 100 may include computing device 104 to perform disclosed processes.

In some embodiments, device 104 may include processor 108. Processor 108 may provide processing resources to perform disclosed processes. For example, processor 108 may generate a digitized finite state machine based on probabilistic data (e.g., range data and/or weight data).

In some embodiments, device 104 may include memory 110. Memory 110 may store data and/or instructions for performing disclosed processes. In some embodiments, device 104 may include storage 106. Storage 106 may store digitized instructions and computerized data. For example, storage 106 may include non-transitory computer-readable storage medium including instructions to perform disclosed processes. Device 104 may generate instructions in storage 106 that are transmitted to configure specialized device 102 to perform disclosed processes.

In some embodiments, device 104 may include I/O 112 (input-output interface). I/O 112 may connect to I/O Device(s) 114 and specialized device 102. For example, device 104 may receive input (e.g., user input or network communication) from I/O Device(s) 114. Device 104 may transmit programming instructions to specialized device 102, as well as, receive computing results from specialized device 102. For example, specialized device 102 may transmit pseudo-random numbers to device 104.

Device 104 may connect to specialized device 102. Specialized device 102 may be a specialized pattern-matching device for implementing digitized finite state machines. For example, specialized device 102 may be an Automata Processor, such as an Automata Processor PCIe board.

Specialized device 102 (e.g., an Automata Processor (AP)) may reproduce the power of a theoretical non-deterministic finite automata to non-deterministic parallelism. In this context, non-determinism may not imply stochastic behavior, but instead may denote an exploration of all possible parallel paths through an automata at once. For problems with large, combinatorially difficult search spaces, non-determinism may be an extremely powerful tool, enabling a fast, parallel exploration of an exponential number of problem instances.

Efficient implementations of non-deterministic finite automata in hardware may fall into two broad categories: specialized dynamically reconfigurable hardware for deterministic finite automata (DFA) and non-deterministic finite automata (NFA) execution, and static, circuit-based field-programmable gate array (FPGA) implementations. Specialized hardware to execute DFAs and NFAs may accelerate regular expression matching. However, existing architectures are application-specific and can only solve problems framed as regular expression matching. Static, circuit-based FPGA implementations of NFAs and DFAs may be much more flexible in their capabilities, but may suffer from density, scalability, and throughput limitations. Both specialized hardware and static logic solutions may not expose automata level programmability to the application developer, which may prevent the creation of automata that are either not convenient or even able to be expressed as regular expressions.

Specialized device 102 (e.g., an AP) may include a unique memory arrangement For example, Micron's AP may include unique, memory-derived architecture may take advantage of the bit-level parallelism inherent in synchronous dynamic random-access memory (SDRAM) arrays to gain improvements in state density over previous NFA and DFA implementations. In another example, Micron's AP may be configured using both pearl-compatible regular expressions (PCRE) and Automata Network Markup Language (ANML), which may offer programmers finegrained control over automata construction.

In some embodiments, specialized device 102 may include two AP cores that are combined to form an AP chip package and each core in the chip currently connects to the system via a shared double data rate type three (DDR3) interface. For example, 8 AP chips maybe combined on a dual in-line memory module (DIMM) package, and up to 4-6 small outline dual in-line memory modules (SO-DIMMs) may be supported on a single PCIe accelerator board. Therefore, specialized device 102 may include a single AP board with a base configuration having 64 AP cores. In some embodiments, specialized device 102 may include an accelerator board with an Altera Stratix IV FPGA, which may include memory controllers and PCIe hardware to support AP DIMM modules. All STEs on an AP chip may be reconfigured in approximately 45 ms.

In some embodiments, STEs of specialized device 102 may trigger output. For example, when an STE on an AP chip reports, the AP may generate a report vector. Each report vector may be a bit-vector representation of all reporting STEs that activated at that particular cycle, and may contain up to 1,024 bits. Each chip may contain 6 reporting capable of exporting 1,024 output vectors in 1.8 ms. Therefore, a best-case upper-bound for the full AP output throughput may be approximately 437 MB/s per AP chip, or 14 GB/s per board.

The above metrics may be representative of first-generation AP architecture and implementation. Future AP system architectures may enable direct reads and writes to AP memories via a CPU's front-side bus, or other inter-processor interconnect, which may permit much lower AP reconfiguration times and much higher output throughput.

Figure 2:
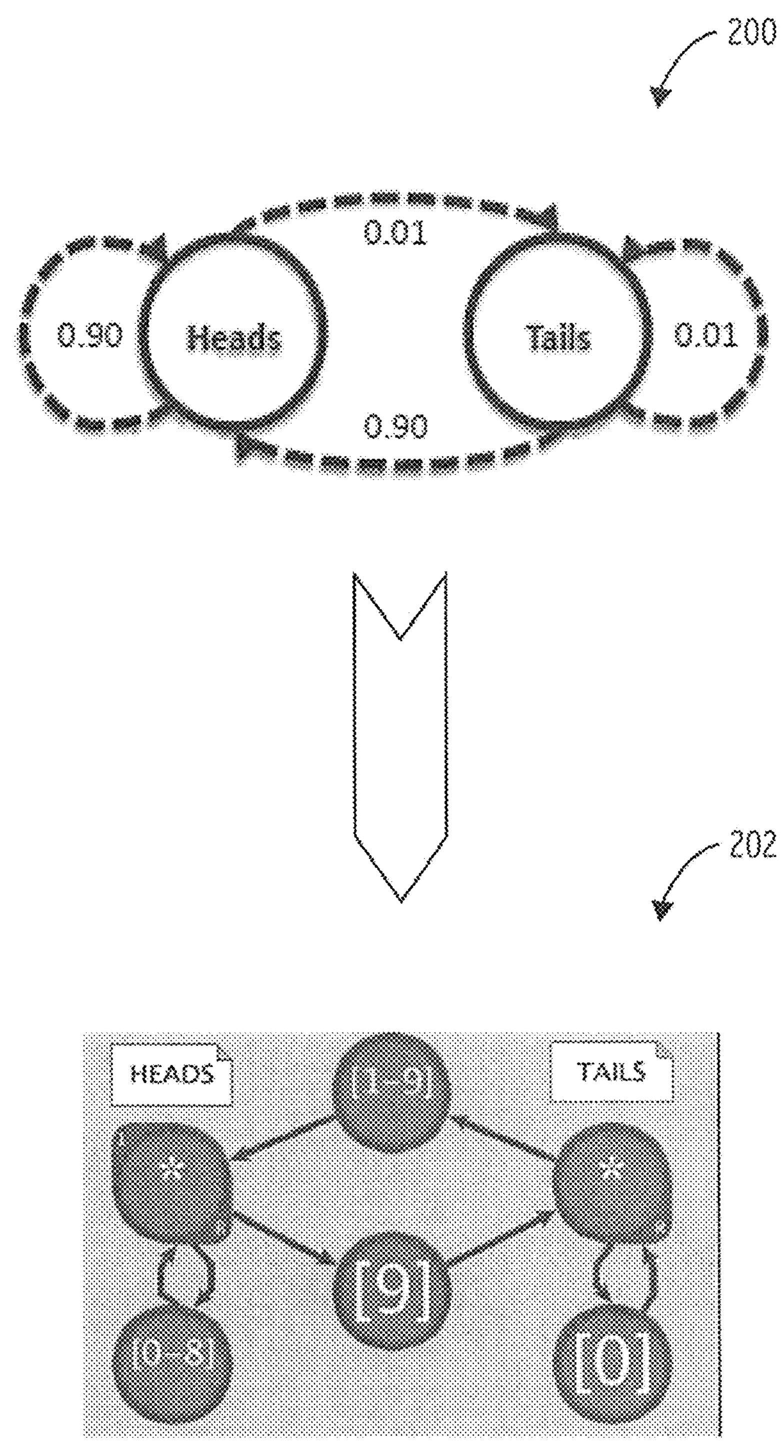
FIG. 2 illustrates an exemplary finite state machine for generating pseudo-random numbers in accordance with disclosed embodiments.

FIG. 2 illustrates an exemplary finite state machine for generating pseudo-random numbers.

A simple Markov chain that simulates an unfair coin toss with two states: Heads and Tails. Transition probabilities between these states are unfair meaning that the probability of transitioning to, or flipping, Heads is different than Tails.

In informal terms, Markov Chains are automata with probabilistic transitions between states. To be formally considered a Markov chain, transitions in the automaton may be stochastic processes (e.g., they occur with some probability), and respect the Markov property, which states that every probabilistic transition depends only on the current state, and is not influenced by memory of prior states. An example Markov Chain describing the behavior of tosses of an unfair coin is illustrated by diagram 200.

Markov chains are defined by stochastic transition matrices which hold all transition probabilities from a start state (row) to a transition state (column). Each row of the transition matrix may be stochastic. For example, each stochastic row may add up to 1. The state may make some transition in each time step, even if it is to the current node.

A Markov chain implemented on the AP corresponding to the Markov chain in diagram 202, with two "star states" representing Heads and Tails. In an embodiment, "star states" may match on any character. For example, a "star state" may activate on any 8-bit input symbol, making the probability of transitioning to a "star state" from a previous state is 100%. Transition probabilities between these states are unfair and are modeled by dividing the possible input symbols [0-9] into random groups, proportional to the transition probabilities as those of diagram 200. Diagram 202 may represent programming instructions for specialized device 102 (e.g., an AP).

AP automata may be made up of a directed graph of state transition elements (STEs), which can recognize an arbitrary character set of 8-bit symbols. An STE may "activate" when it recognizes the current input symbol and it is "enabled." An STE may be considered enabled when it is either configured to consume input from the input stream (a "start" STE), or an STE connected to it activated on the previous cycle. STEs can be configured to report on activation, which may produce a 1-bit output, analogous to accepting an input string in an NFA.

Figure 3:
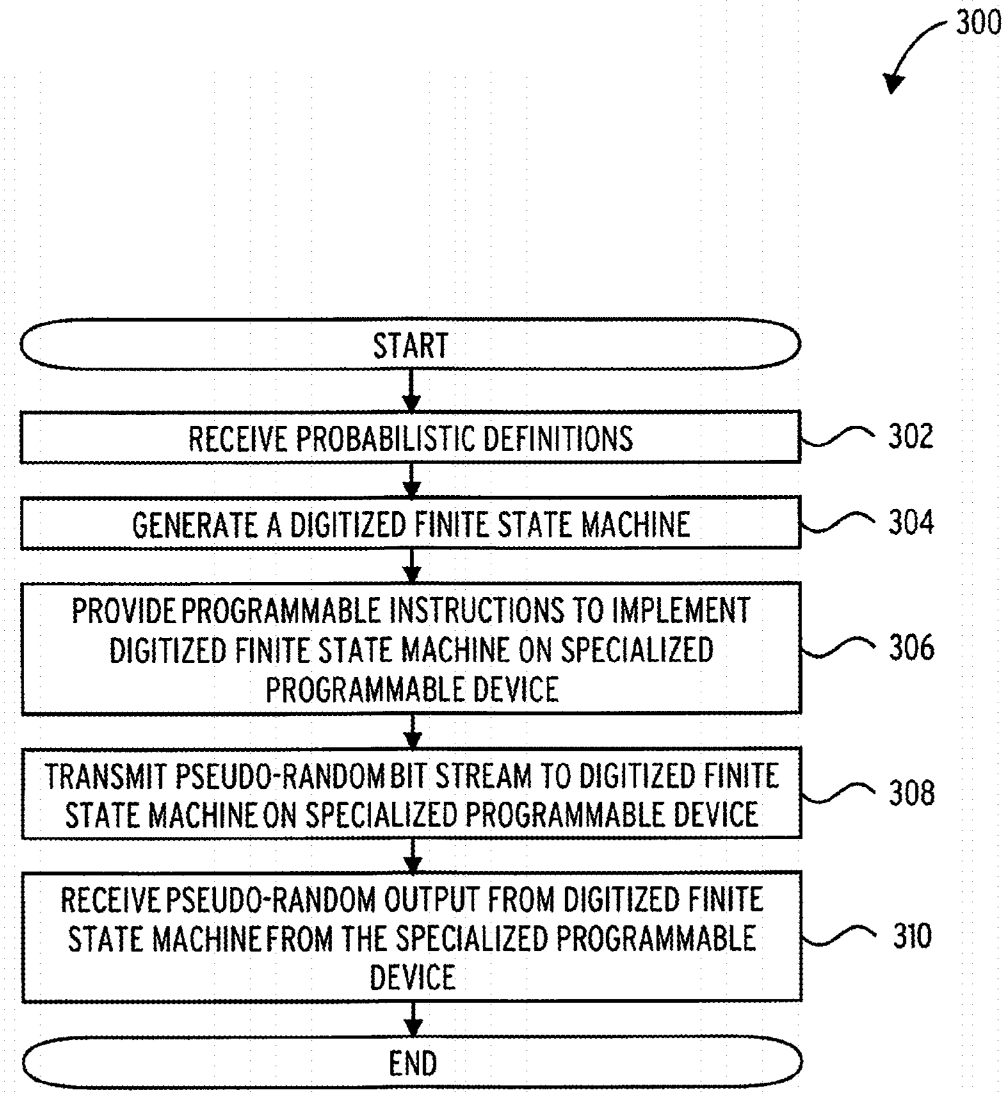
FIG. 3 illustrates an exemplary process for generating pseudo-random numbers in accordance with disclosed embodiments.

FIG. 3 illustrates an exemplary process for generating pseudo-random numbers in accordance with disclosed embodiments.

In step 302, routine 300 may receive probabilistic definitions. System 100 may receive data indicating the parameters for pseudo-random number generation. For example, device 104 may receive digitized instructions describing the desired range of pseudo-random numbers to produce and/or the desired distribution for the pseudo-random numbers (e.g., the probabilistic transitions). System 100 may receive the state data and the weight data in the form of a stochastic transition matrix.

In some embodiments, probabilistic definitions may include the range of desired outputs. System 100 may receive a number of states for which random output is desired. For example, system 100 may receive input such as "2" when binary output is required, mimicking results for a coin flip. In another example, system 100 may receive "6" as input to mimic the roll of a six-sided die. Additional numbers of states may be used depending on the desired output. The range of desired output may further represent the output numbers desired to correspond to each of the states. For example, when there are two states to mimic a coin toss, probabilistic definitions may further detail that the two states should be labeled "0" and "1." In another example, a simulation of a six-sided die having six states, probabilistic definitions may indicate that the states should range from one ("1") to six ("6") to correspond to traditional numbers on a six-sided die.

In some embodiments, probabilistic definitions may include weight data. Weight data may indicate the desired probability or probabilistic distribution for each state. For example, for a fair coin toss (e.g., having an even or uniform distribution), each state (e.g., "0" and "1") would have equal probability (e.g., "0.5" for each). In the example of a fair six-sided die, each state would have a weight of one sixth (e.g., approximately "0.167"). In some embodiments, uneven (e.g., not uniform) or "unfair" distributions may be desired. For example, weight data may describe an unfair coin toss by indicating different weights for each state. In such an example, state "0" (e.g., "heads" for the coin) may have a probability of "0.9" while state "1" has a probability of "0.1". Weight data may assign any desired probability target so long as the weights total "1.0". In some embodiments, process 300 may normalize the weights to "1.0" when the entered weights do not total "1.0".

In step 304, routine 300 may generate a digitized finite state machine. For example, system 100 may generate a digitized finite state machine based on probabilistic definitions. To communicate the concept of probabilistic transitions and implement Markov chains on an AP, system 100 may map the probabilistic definitions to a digitized finite state machine. In some embodiments, system 100 may generate a Markov chain for the AP that utilizes an input symbol stream having uniformly distributed random symbols. Each Markov chain may be constructed using a stochastic transition matrix.

An example Markov chain for an unfair coin example is shown in FIG. 2. For example, diagrams 200 and 202, as shown, are based on the input symbols being within the character class [0-9]. In some embodiments, a single state out of all possible states may be chosen arbitrarily to act as the start state. In some embodiments, fully connected fair Markov chains having transitions to all states are equally likely may not need a randomly chosen start state, as steady state behavior may be reached after the first cycle. As shown in FIG. 2, the construction may take two cycles to generate an output, one to transition to a transition node, and another to transition to the star state. Other embodiments may modify the state machine to generate an output on every cycle by also setting a randomly selected transition node, along with an arbitrary state node, to act as a start state. In such an embodiment, one state node and one transition node may be active on any given cycle, which may act as a pipeline for two probabilistic transitions.

To construct a PRNG from a single Markov chain, process 300 may build a fair Markov chain of a predetermined number of states. For example, a two-state chain may produce a single bit output on every cycle. In other examples, any number of states may be used to construct a Markov chain as long as transitions to all states are equally likely. When the state output is in binary bits, the number of states in the Markov chain may be a power of two to ensure a uniformly distributed output bits. On every cycle, a single chain may report which state it randomly transitioned to, which may emit output corresponding to log 2(states) bits of random output per machine per cycle. In some embodiments, multiple Markov chains may be used. Additional Markov chains may be added, and their output may be interleaved, to increase the total amount of pseudo-random output relative to the input symbols used to drive random transitions. For example, a single 2-state Markov chain may emit a single random bit per random input byte, while eight 2-state chains create the same amount of random output as input.

In step 306, routine 300 may provide, to a specialized pattern-matching device, programmable instructions to implement the digitized finite state machine on the specialized pattern-matching device.

In some embodiments, specialized device 102 (e.g., an AP) may be programmed using automata, such as those described using a directed graph of state transition elements (STEs) corresponding to states of a digitized finite state machine, which can recognize an arbitrary character set of 8-bit symbols. An STE may "activate" when it (1) recognizes the current input symbol and (2) it is "enabled." An STE may be considered enabled when it is either configured to consume input from the input stream (a "start" STE), or a STE connected to it activated on the previous cycle. STEs may be configured to report on activation, producing a 1-bit output, similar to accepting an input string in a NFA. Device 104 may receive such output using I/O 112.

Specialized device 102 (e.g., an AP) may implement STEs using 256-bit memory columns AN Ded with an enable signal. Each 256-bit column vector may represent a character set of 256 possible 8-bit characters that this STE could recognize. Any character, supplied as a row address will then force all STE columns that recognize that character set to read out a 1 in parallel. For example, the Kleene star operator would simply fill all bit rows in the STE column with 1s. Thus, an STE may be capable of recognizing an arbitrary character set of possible input symbols on every cycle. If a column reads a "1" and the STE is enabled, the STE may activate and send its output signal to the routing matrix. The routing matrix may allow STEs to connect to and enable any other STEs within the same AP core, and may be pre-configured (placed and routed) based on the compiled AP application and automaton design. Columns of STEs are organized into blocks and a number of blocks makes up an AP core. Because the routing matrix only exists within cores, STEs may be prevented from enabling other STEs across cores. In the current generation AP hardware, a block may contain 256 STEs, 32 of which can report. AP cores may contain 96 blocks, offering a total of 24,576 STEs per core. The first generation AP hardware may operate at a constant frequency of 133 MHz, consuming a symbol every 7.5 ns, thus providing a throughput of 133 MB/s per core.

In step 308, device 104 may transmit a pseudo-random bit stream to a digitized finite state machine. Device 104 may produce a random stream of input with a predetermined level of randomness. For example, device 104 may transmit a stream of random characters to the PRNG of specialized device 102. Specialized device 102 may receive and process the random input on the digitized finite state machine. For example, in the example illustrated in FIG. 2, the digitized finite state machine may receive a stream of characters ranging from zero to nine. Specialized device 102 (e.g., an AP) may process each digit of input by transitioning to the appropriate state of the digitized finite state machine. Depending on the configuration of the digitized finite state machine, the state transition may include reporting functionality.

In step 310, routine 300 may include device 104 receiving pseudo-random output from a specialized pattern-matching device. In some embodiments, specialized device 102 may process a bit stream using a digitized finite state machine (e.g., a Markov chain) to produce pseudo-random output. The digitized finite state machine may include reporting functionality to produce output based on the current state transition of the digitized finite state machine. For example, the state transition may include reporting instructions that may cause an AP to generate pseudo-random output. The AP may transmit the reporting output to device 104.

Because only 32 memory elements (MEs) out of 256 in an AP block are capable of reporting, each Markov chain may be limited by either reporting elements or total STEs per block. An N-state chain requires N reporting elements, thus system 100 may instantiate a maximum of 16, 8, and 4 chains per block for 2, 4, and 8-state chains on an AP, respectively. An N-state chain may need N2+N STEs, thus system 100 may instantiate a maximum of 42, 12, and 3 chains per block for 2, 4, and 8-state chains respectively. While reporting elements may limit how many 2- and 4-state chains an AP may fit onto a given block, the total STEs may limit the number of 8-state chains. Given that an AP core has 96 blocks, 2 and 4-state chains may provide a 384× increase in throughput, while 8-state chains may provide a 288× increase in throughput per input symbol.

Figure 4:
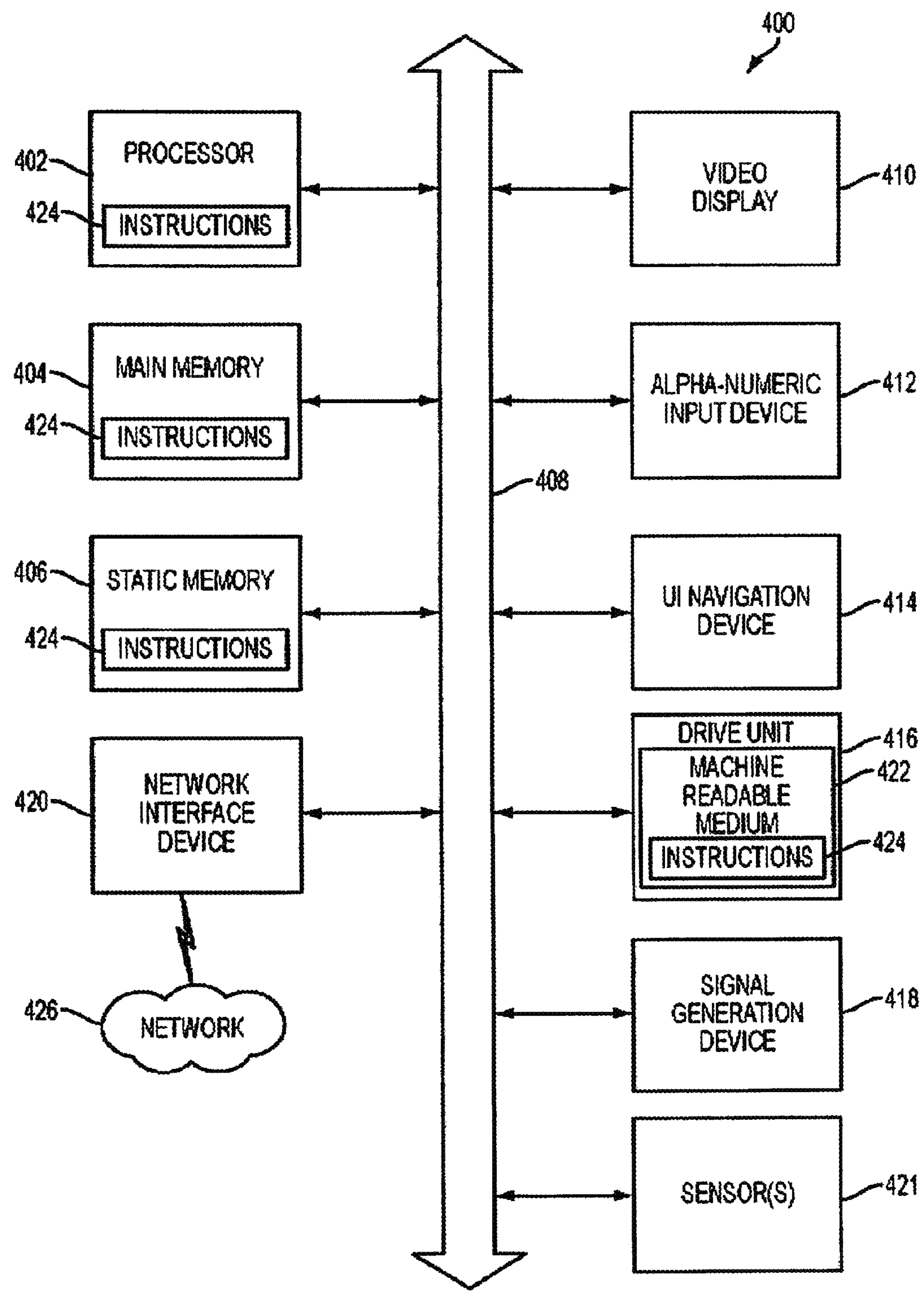
FIG. 4 illustrates a block diagram illustrating an example of a machine upon which one or more aspects of embodiments of the present invention can be implemented.

FIG. 4 illustrates a block diagram of an exemplary machine 400 upon which one or more embodiments (e.g., discussed methodologies) can be implemented (e.g., run). Examples of machine 400 can include logic, one or more components, circuits (e.g., modules), or mechanisms. Circuits are tangible entities configured to perform certain operations. In an example, circuits can be arranged (e.g., internally or with respect to external entities such as other circuits) in a specified manner. In an example, one or more computer systems (e.g., a standalone, client or server computer system) or one or more hardware processors (processors) can be configured by software (e.g., instructions, an application portion, or an application) as a circuit that operates to perform certain operations as described herein. In an example, the software can reside (1) on a non-transitory machine readable medium or (2) in a transmission signal. In an example, the software, when executed by the underlying hardware of the circuit, causes the circuit to perform the certain operations.

In an example, a circuit can be implemented mechanically or electronically. For example, a circuit can comprise dedicated circuitry or logic that is specifically configured to perform one or more techniques such as discussed above, including, for example, a special-purpose processor, a field programmable gate array (FPGA), or an application-specific integrated circuit (ASIC). In an example, a circuit can comprise programmable logic (e.g., circuitry, as encompassed within a general-purpose processor or other programmable processor) that can be temporarily configured (e.g., by software) to perform the certain operations. It will be appreciated that the decision to implement a circuit mechanically (e.g., in dedicated and permanently configured circuitry), or in temporarily configured circuitry (e.g., configured by software) can be driven by cost and time considerations.

Accordingly, the term "circuit" is understood to encompass a tangible entity, be that an entity that is physically constructed, permanently configured (e.g., hardwired), or temporarily (e.g., transitorily) configured (e.g., programmed) to operate in a specified manner or to perform specified operations. In an example, given a plurality of temporarily configured circuits, each of the circuits need not be configured or instantiated at any one instance in time. For example, where the circuits comprise a general-purpose processor configured via software, the general-purpose processor can be configured as respective different circuits at different times. Software can accordingly configure a processor, for example, to constitute a particular circuit at one instance of time and to constitute a different circuit at a different instance of time.

In an example, circuits can provide information to, and receive information from, other circuits. In this example, the circuits can be regarded as being communicatively coupled to one or more other circuits. Where multiple of such circuits exist contemporaneously, communications can be achieved through signal transmission (e.g., over appropriate circuits and buses) that connect the circuits. In embodiments in which multiple circuits are configured or instantiated at different times, communications between such circuits can be achieved, for example, through the storage and retrieval of information in memory structures to which the multiple circuits have access. For example, one circuit can perform an operation and store the output of that operation in a memory device to which it is communicatively coupled. A further circuit can then, at a later time, access the memory device to retrieve and process the stored output. In an example, circuits can be configured to initiate or receive communications with input or output devices and can operate on a resource (e.g., a collection of information).

The various operations of method examples described herein can be performed, at least partially, by one or more processors that are temporarily configured (e.g., by software) or permanently configured to perform the relevant operations. Whether temporarily or permanently configured, such processors can constitute processor-implemented circuits that operate to perform one or more operations or functions. In an example, the circuits referred to herein can comprise processor-implemented circuits.

Similarly, the methods described herein can be at least partially processor implemented. For example, at least some of the operations of a method can be performed by one or more processors or processor-implemented circuits. The performance of certain of the operations can be distributed among the one or more processors, not only residing within a single machine, but deployed across a number of machines. In an example, the processor or processors can be located in a single location (e.g., within a home environment, an office environment or as a server farm), while in other examples the processors can be distributed across a number of locations.

The one or more processors can also operate to support performance of the relevant operations in a "cloud computing" environment or as a "software as a service" (SaaS). For example, at least some of the operations can be performed by a group of computers (as examples of machines including processors), with these operations being accessible via a network (e.g., the Internet) and via one or more appropriate interfaces (e.g., Application Program Interfaces (APIs).)

Exemplary embodiments (e.g., apparatus, systems, or methods) can be implemented in digital electronic circuitry, in computer hardware, in firmware, in software, or in any combination thereof. Example embodiments can be implemented using a computer program product (e.g., a computer program, tangibly embodied in an information carrier or in a machine readable medium, for execution by, or to control the operation of, data processing apparatus such as a programmable processor, a computer, or multiple computers).

A computer program can be written in any form of programming language, including compiled or interpreted languages, and it can be deployed in any form, including as a stand-alone program or as a software module, subroutine, or other unit suitable for use in a computing environment. A computer program can be deployed to be executed on one computer or on multiple computers at one site or distributed across multiple sites and interconnected by a communication network.

In an example, operations can be performed by one or more programmable processors executing a computer program to perform functions by operating on input data and generating output. Examples of method operations can also be performed by, and an exemplary apparatus can be implemented as, special purpose logic circuitry (e.g., a field programmable gate array (FPGA) or an application-specific integrated circuit (ASIC)).

The computing system can include clients and servers. A client and server are generally remote from each other and generally interact through a communication network. The relationship of client and server arises by virtue of computer programs running on the respective computers and having a client-server relationship to each other.

In embodiments deploying a programmable computing system, it will be appreciated that both hardware and software architectures require consideration. Specifically, it will be appreciated that the choice of whether to implement certain functionality in permanently configured hardware (e.g., an ASIC), in temporarily configured hardware (e.g., a combination of software and a programmable processor), or a combination of permanently and temporarily configured hardware can be a design choice. Below are set out hardware (e.g., machine 400) and software architectures that can be deployed in exemplary embodiments. In an example, the machine 400 can operate as a standalone device or machine 400 can be connected (e.g., networked) to other machines. In a networked deployment, machine 400 can operate in the capacity of either a server or a client machine in server-client network environments. In an example, machine 400 can act as a peer machine in peer-to-peer (or other distributed) network environments. Machine 400 can be a personal computer (PC), a tablet PC, a set-top box (STB), a Personal Digital Assistant (PDA), a mobile telephone, a web appliance, a network router, switch or bridge, or any machine capable of executing instructions (sequential or otherwise) specifying actions to be taken (e.g., performed) by machine 400. Further, while only a single machine 400 is illustrated, the term "machine" shall also be taken to include any collection of machines that individually or jointly execute a set (or multiple sets) of instructions to perform any one or more of the methodologies discussed herein.

Exemplary machine (e.g., computer system) 400 can include a processor 402 (e.g., a central processing unit (CPU), a graphics processing unit (GPU), or both), a main memory 404 and a static memory 406, some or all of which can communicate with each other via a bus 408. Machine 400 can further include a display unit 410, an alphanumeric input device 412 (e.g., a keyboard), and a user interface (UI) navigation device 414 (e.g., a mouse). In an example, the display unit 410, input device 417 and UI navigation device 414 can be a touch screen display. Machine 400 can additionally include a storage device (e.g., drive unit) 416, a signal generation device 418 (e.g., a speaker), a network interface device 420, and one or more sensors 421, such as a global positioning system (GPS) sensor, compass, accelerometer, or other sensor.

Storage device 416 can include a machine readable medium 422 on which is stored one or more sets of data structures or instructions 424 (e.g., software) embodying or utilized by any one or more of the methodologies or functions described herein. Instructions 424 can also reside, completely or at least partially, within main memory 404, within static memory 406, or within processor 402 during execution thereof by machine 400. In an example, one or any combination of processor 402, main memory 404, static memory 406, or storage device 416 can constitute machine readable media.

While machine readable medium 422 is illustrated as a single medium, the term "machine readable medium" can include a single medium or multiple media (e.g., a centralized or distributed database, and/or associated caches and servers) that configured to store the one or more instructions 424. The term "machine readable medium" can also be taken to include any tangible medium that is capable of storing, encoding, or carrying instructions for execution by the machine and that cause the machine to perform any one or more of the methodologies of the present disclosure or that is capable of storing, encoding or carrying data structures utilized by or associated with such instructions. The term "machine readable medium" can accordingly be taken to include, but not be limited to, solid-state memories, and optical and magnetic media. Specific examples of machine readable media can include non-volatile memory, including, by way of example, semiconductor memory devices (e.g., Electrically Programmable Read-Only Memory (EPROM), Electrically Erasable Programmable Read-Only Memory (EEPROM)) and flash memory devices; magnetic disks such as internal hard disks and removable disks; magneto-optical disks; and CD-ROM and DVD-ROM disks.

Instructions 424 can further be transmitted or received over a communications network 426 using a transmission medium via the network interface device 420 utilizing any one of a number of transfer protocols (e.g., frame relay, IP, TCP, UDP, HTTP, etc.). Exemplary communication networks can include a local area network (LAN), a wide area network (WAN), a packet data network (e.g., the Internet), mobile telephone networks (e.g., cellular networks), Plain Old Telephone (POTS) networks, and wireless data networks (e.g., IEEE 802.11 standards family known as Wi-Fi®, IEEE 802.16 standards family known as WiMax®), peer-to-peer (P2P) networks, among others. The term "transmission medium" shall be taken to include any intangible medium that is capable of storing, encoding or carrying instructions for execution by the machine, and includes digital or analog communications signals or other intangible medium to facilitate communication of such software.

Various embodiments or aspects of the disclosure, for example, can be implemented as software in a computing device, or alternatively, on hardware. An exemplary computing device in which disclosed embodiments, or a portion thereof, may be implemented is schematically illustrated in FIGS. 5 and 6.

Figure 5:
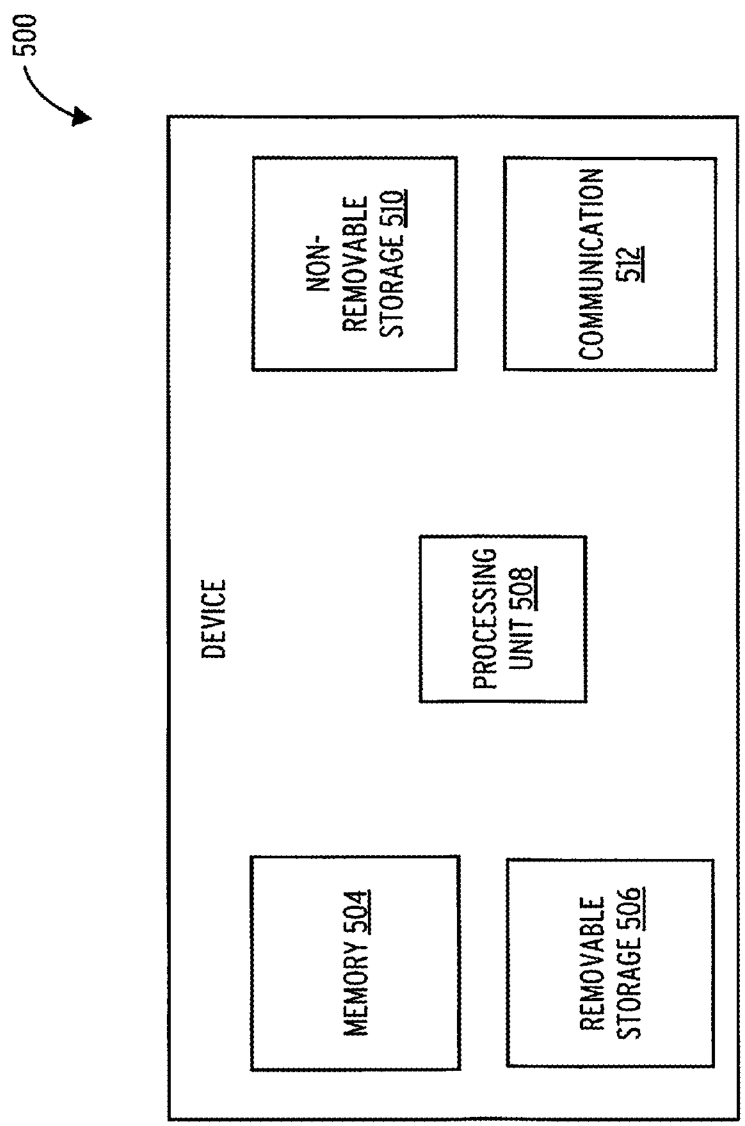
FIG. 5 illustrates an exemplary computing device in accordance with disclosed embodiments.
Figure 6:
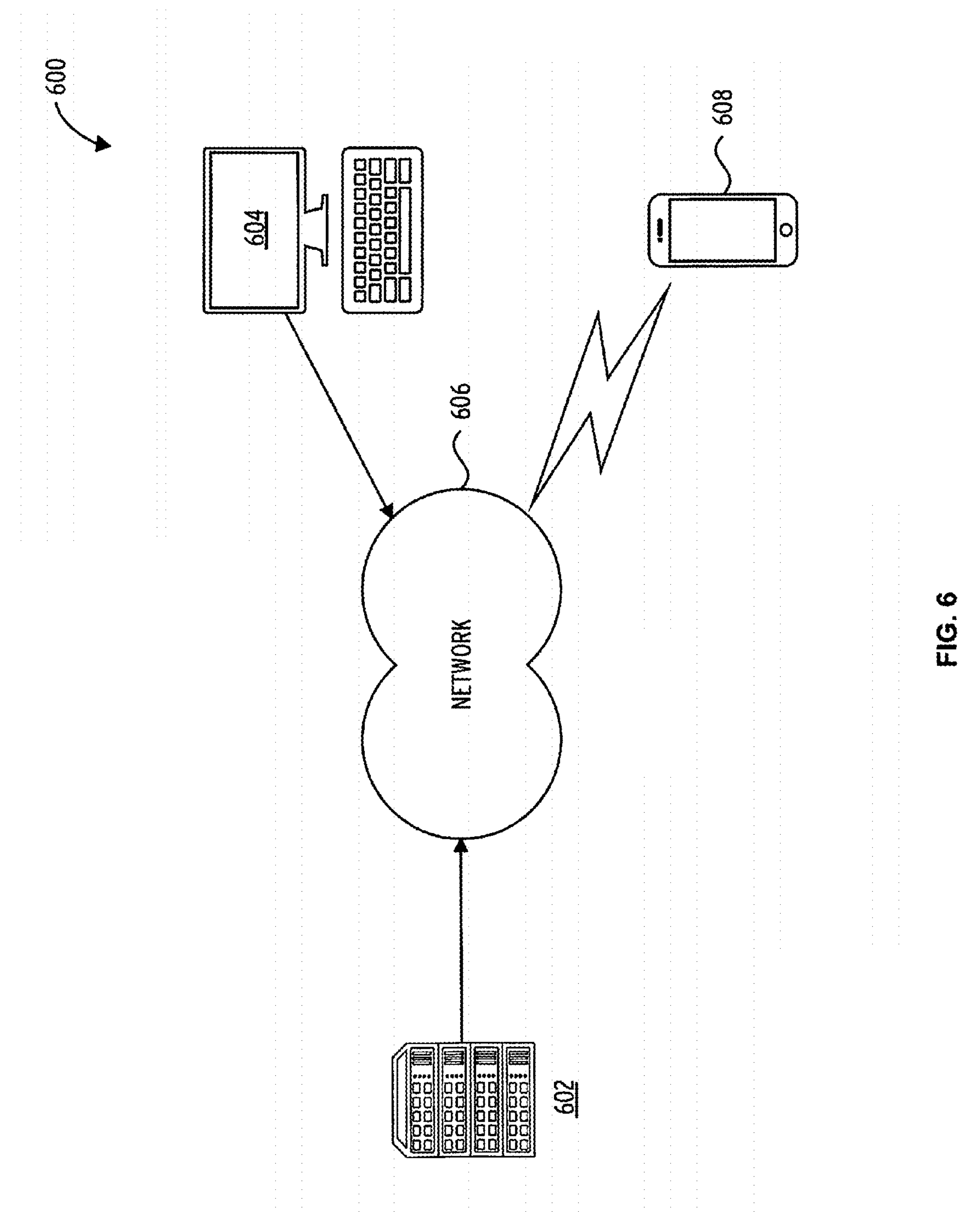
FIG. 6 illustrates an exemplary computing environment in accordance with disclosed embodiments.

Referring to FIG. 5, in its most basic configuration, device 500 may include at least one Processing unit 508 and Memory 504. Depending on the exact configuration and type of computing device, Memory 504 can be volatile (such as RAM), non-volatile (such as ROM, flash memory, etc.) or some combination of the two. Additionally, device 500 may also have other features and/or functionality. For example, the device could also include additional removable and/or non-removable storage including, but not limited to, magnetic or optical disks or tape, as well as writable electrical storage media. Such additional storage is the figure by removable storage 506 and non-removable storage 510. Computer storage media includes volatile and nonvolatile, removable and non-removable media implemented in any method or technology for storage of information such as computer readable instructions, data structures, program modules or other data. The memory, the removable storage and the non-removable storage are all examples of computer storage media. Computer storage media includes, but is not limited to, RAM, ROM, EEPROM, flash memory or other memory technology CDROM, digital versatile disks (DVD) or other optical storage, magnetic cassettes, magnetic tape, magnetic disk storage or other magnetic storage devices, or any other medium which can be used to store the desired information and which can accessed by the device. Any such computer storage media may be part of, or used in conjunction with, the device.

The device may also contain one or more communications connections 512 that allow the device to communicate with other devices (e.g. other computing devices). The communications connections carry information in a communication media. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode, execute, or process information in the signal. By way of example, and not limitation, communication medium includes wired media such as a wired network or direct-wired connection, and wireless media such as radio, RF, infrared and other wireless media. As discussed above, the term computer readable media as used herein includes both storage media and communication media.

In addition to a stand-alone computing machine, embodiments of the invention can also be implemented on a network system comprising a plurality of computing devices that are in communication with a networking means, such as a network with an infrastructure or an ad hoc network. The network connection can be wired connections or wireless connections.

As a way of example, FIG. 6 illustrates a network system 600 in which embodiments of the invention can be implemented. In this example, the network system may include computer 602 (e.g., a network server), network connection 606 (e.g. wired and/or wireless connections), computer terminal 604, and PDA (e.g. a smartphone) 608 (or other handheld or portable device, such as a cell phone, laptop computer, tablet computer, GPS receiver, mp3 player, handheld video player, pocket projector, etc. or handheld devices (or non-portable devices) with combinations of such features). The embodiments of the invention can be implemented in any of the devices of the system.

For example, execution of the instructions or other desired processing can be performed on the same computing device that is any one of 602, 604, and 608. Alternatively, an embodiment of the invention can be performed on different computing devices of the network system. For example, certain desired or required processing or execution can be performed on one of the computing devices of the network (e.g. server 602), whereas other processing and execution of the instruction can be performed at another computing device (e.g. terminal 604) of the network system, or vice versa. In fact, certain processing or execution can be performed at one computing device (e.g. server 602); and the other processing or execution of the instructions can be performed at different computing devices that may or may not be networked. For example, the certain processing can be performed at terminal 604, while the other processing or instructions are passed to device 608 where the instructions are executed. This scenario may be of particular value especially when the PDA device, for example, accesses to the network through computer terminal 604 (or an access point in an ad hoc network). For another example, software to be protected can be executed, encoded or processed with one or more embodiments of the invention. The processed, encoded or executed software can then be distributed to customers. The distribution can be in a form of storage media (e.g. disk) or electronic copy.

Practice of an aspect of an embodiment (or embodiments) of the invention is presented herein for illustration only and should not be construed as limiting the invention in any way.

An approach of the present invention systems and designs and optimization system and techniques may be based on the tools, programs and operating systems as discussed throughout this disclosure, such techniques can be applied to various hardware, tools, operating systems, virtual machines, parallel virtual machines (PVMs), or executable formats.

What is claimed is:

1. A method for generating pseudo-random numbers, comprising:

receiving, by at least one processor, range data indicating a range of numbers;

generating, based on the range data and by the at least one processor, a digitized finite state machine configured to produce pseudo-random output within the range of numbers;

providing, by the at least one processor to a specialized pattern-matching device, programmable instructions to implement the digitized finite state machine on the specialized pattern-matching device;

generating, by the at least one processor, a pseudo-random bit stream;

transmitting, by the at least one processor to the specialized pattern-matching device, the pseudo-random bit stream for processing by the digitized finite state machine; and receiving, by the at least one processor from the specialized pattern-matching device, pseudo-random output from the digitized finite state machine based on the pseudo-random bit stream input to the digitized finite state machine.

2. The method of claim 1, wherein the specialized pattern-matching device is an Automata Processor PCIe board.

3. The method of claim 1, wherein the digitized finite state machine includes a number of states corresponding to the range of numbers.

4. The method of claim 1, further comprising:

receiving, by the at least one processor, weight data indicating a distribution for the range of numbers;

wherein the digitized finite state machine includes probabilistic transitions corresponding to the distribution for the range of numbers.

5. The method of claim 4, wherein the weight data indicates that the distribution should be uniform; and the probabilistic transitions each have an equal weight, based on the weight data indicating that the distribution should be uniform.

6. The method of claim 1, wherein the digitized finite state machine is formed from multiple Markov chains.

7. A non-transitory computer-readable storage medium for generating pseudo-random numbers, the computer-readable storage medium including instructions that when executed by at least one processor, cause the at least one processor to:

receive, by the at least one processor, range data indicating a range of numbers;

generate, based on the range data and by the at least one processor, a digitized finite state machine configured to produce pseudo-random output within the range of numbers;

provide, by the at least one processor to a specialized pattern-matching device, programmable instructions to implement the digitized finite state machine on the specialized pattern-matching device;

generate, by the at least one processor, a pseudo-random bit stream;

transmit, by the at least one processor to the specialized pattern-matching device, the pseudo-random bit stream for processing by the digitized finite state machine; and receive, by the at least one processor from the specialized pattern-matching device, pseudo-random output from the digitized finite state machine based on the pseudo-random bit stream input to the digitized finite state machine.

8. The computer-readable storage medium of claim 7, wherein the specialized pattern-matching device is an Automata Processor PCIe board.

9. The computer-readable storage medium of claim 7, wherein the digitized finite state machine includes a number of states corresponding to the range of numbers.

10. The computer-readable storage medium of claim 7, wherein the instructions further configure the at least one processor to:

receive, by the at least one processor, weight data indicating a distribution for the range of numbers;

wherein the digitized finite state machine includes probabilistic transitions corresponding to the distribution for the range of numbers.

11. The computer-readable storage medium of claim 10, wherein the weight data indicates that the distribution should be uniform; and the probabilistic transitions each have an equal weight, based on the weight data indicating that the distribution should be uniform.

12. The computer-readable storage medium of claim 7, wherein the digitized finite state machine is formed from multiple Markov chains.

13. A computing apparatus for generating pseudo-random numbers, the computing apparatus comprising:

at least one processor; and a memory storing instructions that, when executed by the at least one processor, cause the at least one processor to:

receive, by the at least one processor, range data indicating a range of numbers;

generate, based on the range data and by the at least one processor, a digitized finite state machine configured to produce pseudo-random output within the range of numbers;

provide, by the at least one processor to a specialized pattern-matching device, programmable instructions to implement the digitized finite state machine on the specialized pattern-matching device;

generate, by the at least one processor, a pseudo-random bit stream;

transmit, by the at least one processor to the specialized pattern-matching device, the pseudo-random bit stream for processing by the digitized finite state machine; and receive, by the at least one processor from the specialized pattern-matching device, pseudo-random output from the digitized finite state machine based on the pseudo-random bit stream input to the digitized finite state machine.

14. The computing apparatus of claim 13, wherein the specialized pattern-matching device is an Automata Processor PCIe board.

15. The computing apparatus of claim 13, wherein the digitized finite state machine includes a number of states corresponding to the range of numbers.

16. The computing apparatus of claim 13, wherein the instructions further configure the apparatus to:

receive, by the at least one processor, weight data indicating a distribution for the range of numbers;

wherein the digitized finite state machine includes probabilistic transitions corresponding to the distribution for the range of numbers.

17. The computing apparatus of claim 16, wherein the weight data indicates that the distribution should be uniform; and the probabilistic transitions each have an equal weight, based on the weight data indicating that the distribution should be uniform.

18. The computing apparatus of claim 13, wherein the digitized finite state machine is formed from multiple Markov chains.

* * * * *